Feb. 5, 1957  G. R. KELLER ET AL  2,780,427
ARTIFICIAL FEEL DEVICE
Filed July 10, 1952
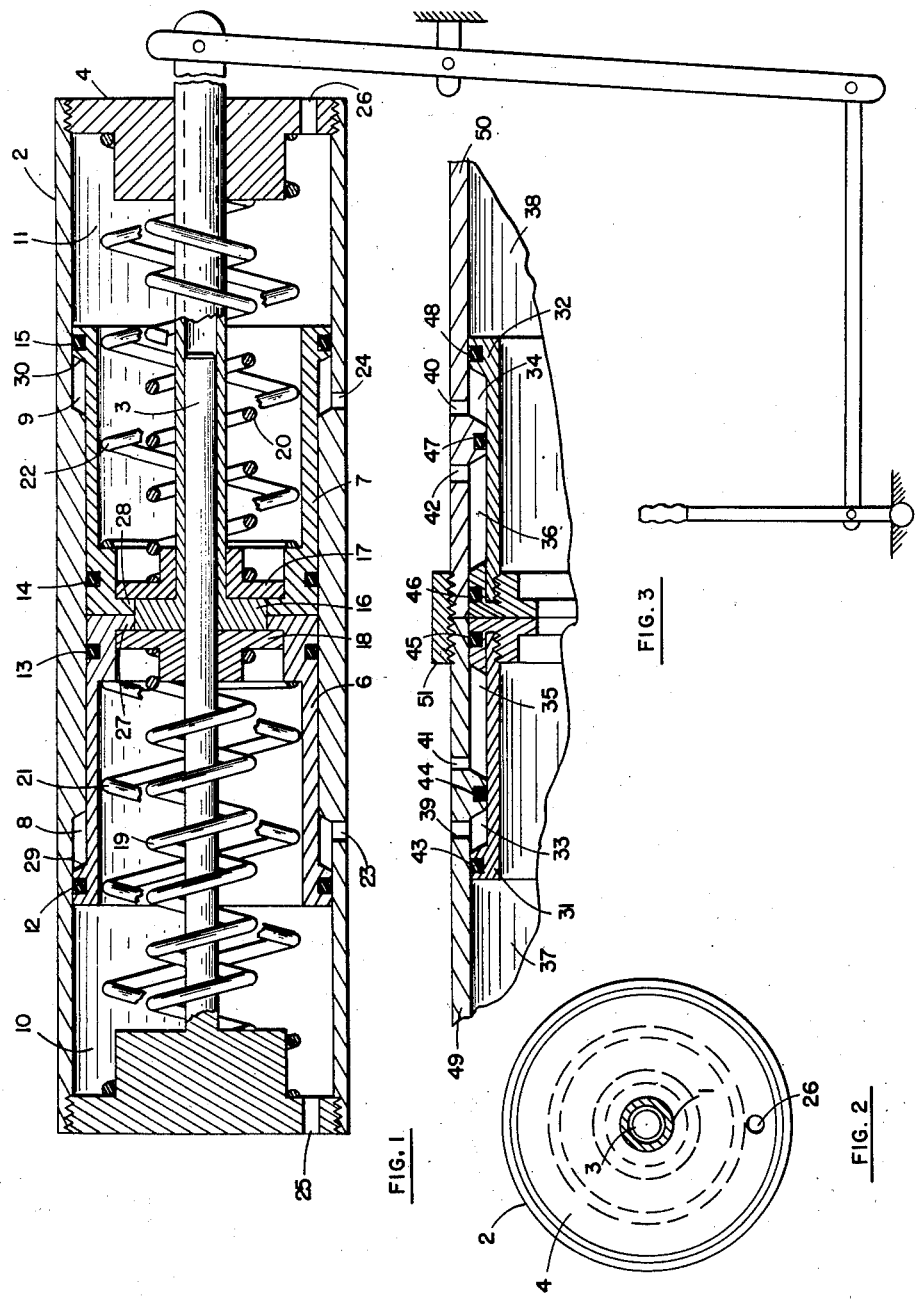
INVENTORS
GEORGE R. KELLER
ROBERT W. JENNY
BY
*William P. Lane*
ATTORNEY

United States Patent Office 2,780,427
Patented Feb. 5, 1957

2,780,427

ARTIFICIAL FEEL DEVICE

George R. Keller, Whittier, Calif., and Robert W. Jenny, Westerly, R. I., assignors to North American Aviation, Inc.

Application July 10, 1952, Serial No. 298,147

7 Claims. (Cl. 244—83)

This invention relates to artificial feel devices, and particularly to devices in which the artificial feel characteristic is eliminated when not desired.

An artificial feel device is a device which provides artificial restraining forces opposing the manual movement of a control system. Ordinarily, when an airplane is equipped with a non-reversible power control system, the reactive forces from the aileron controls is not fed back to the pilot's control. Manual operation of the pilot's control actuates a servo motor which, in turn, provides the force necessary to cause the anticipated movement of the aileron controls. The reactive forces acting on the aileron controls are balanced by torque from the servo motor, and none of these forces are fed back to the pilot's control. The non-reversible power characteristics of the airplane control system result in the pilot not being able to feel the reactive forces caused by the pressure of air currents on the aileron controls. The absence of the familiar sensation caused by these reactive forces is a source of trouble for the pilot since actuation of the aileron controls is possible without the pilot being aware of the actuation. Therefore, it is desirable to provide artificial restraining forces against which the pilot's control must act when manually operated by the pilot.

Devices which provide these artificial restraining forces are commonly called "bungees." These artificial restraining forces are usually provided by a flexible spring which exerts a force opposing the manual operation of the pilot's control and tends to return the pilot's control to a neutral position. Thus the pilot always feels an artificially produced reactive force when he moves the controls of the airplane.

Modern airplanes are equipped with automatic pilot controls as well as the manual pilot controls. When a plane is controlled by the automatic pilot the manual pilot controls are maintained in positional synchronism with the aileron controls. Thus when the automatic pilot is in control and causes the aileron controls to move, the automatic pilot also moves the manual pilot controls a corresponding amount. When an artificial feel device is inserted in the manual control circuit the restraining forces of the "bungee" are also overcome by the automatic pilot. In the past, compensation was incorporated in the automatic pilot to provide the additional power necessary to overcome the additional undesired restraining force of the "bungee."

It is therefore an object of this invention to provide a device for producing artificial restraining forces opposing manual movement of the pilot's control of an airplane equipped with a servo airplane control system.

It is another object of this invention to provide a device which frees the pilot's controls from the artificial restraining forces when automatic pilot controls are used to control the airplane.

Other objects of invention will become apparent from the following description taken in connection with the accompanying drawings, in which Fig. 1 is a sectioned side view of the preferred embodiment of the artificial feel device contemplated by this invention;

Fig. 2 is a right end view of the device shown in Fig. 1; and,

Fig. 3 is a sectioned view drawn to the distinguishing feature of an alternate embodiment of the artificial feel device contemplated by this invention.

Referring to Fig. 1, shaft 1 is operatively attached to the manual pilot control (not shown). Shaft 1 is positioned to move longitudinally in housing 2 when the pilot controls are manually operated by the pilot. Restraining forces opposing the longitudinal movement of shaft 1 are provided by artificial feel springs 19 and 20. When the airplane is controlled by an automatic pilot (not shown) the manual pilot controls are operated by the automatic pilot. Shaft 1 still moves in response to a movement of the manual pilot controls. However, the restraining forces formerly provided by springs 19 and 20 are now undesired. By means of hydraulic pistons 6 and 7, actuated contemporaneously with the actuation of the automatic pilot, springs 19 and 20 are compressed, removing their restraining influence from shaft 1. Therefore when the aircraft is controlled manually and the pilot control causes shaft 1 to move to the right, it is desired that artificial feel spring 20 exert a restraining force opposing the movement of shaft 1 to the right and tending to return shaft 1 to its original position. When the pilot operates the manual controls so as to move shaft 1 to the left, artificial feel spring 19 exerts a restraining force opposing this movement and tending to return shaft 1 to its neutral position. When the aircraft is on automatic control it is desired that artificial feel springs 19 and 20 be prevented from restraining the movement of shaft 1 in any manner. This desired feature is accomplished by compressing springs 19 and 20 using pistons 6 and 7.

A cylindrical housing 2 is positioned coaxially around shaft 1 and spaced from shaft 1 by means of end plug 4 and guide rod 3. Shaft 1 is restricted to a longitudinal movement by guide rod 3. When the aircraft is under manual control with the pilot's control in a neutral position, the position of the springs and the pistons is as shown in Fig. 1. When the pilot moves his manual controls in one direction, shaft 1 moves to the right. This movement of shaft 1 compresses spring 20 by a force acting through spring washer 17 and lobe 16 on shaft 1. As long as the manual controls are displaced in the assumed direction, spring 20 remains compressed and exerts a reactive force against shaft 1 which the pilot feels. Upon return of the manual controls to the neutral position, the restraining force of spring 20 is removed. When the manual control is operated in the opposite direction, shaft 1 moves to the left, compressing spring 19. Spring 19 now exerts a reactive force against shaft 1 which the pilot feels. Upon return of the manual controls to the neutral position, the restraining force of spring 19 is removed.

When the control of the aircraft is switched to an automatic pilot (not shown) an auxiliary switching arrangement is provided to actuate a source (not shown) of fluid pressure. Pistons 6 and 7 are fitted to move longitudinally in cylindrical chambers 10 and 11 of housing 2. Sealed chambers 8 and 9 are formed between pistons 6 and 7, respectively, and housing 2. Chambers 8 and 9 are hydraulically sealed by means of O rings 12, 13, 14, and 15. Ports 23 and 24 connect chambers 8 and 9, respectively, to the source of fluid pressure. The fluid pressure entering chambers 8 and 9, upon actuation of the fluid pressure source, acts against surfaces 29 and 30 of pistons 6 and 7, causing the pistons to move to the left and right, respectively. This movement to the left of piston 6 compresses piston return spring 21. Since lip 27 of piston 6 overlaps spring washer 18, the leftward movement of piston 6 also compresses artificial feel spring 19, completely removing any force which artificial feel spring 19 exerts opposing any subsequent movement of shaft 1. Similarly, piston 7 as it moves to the right compresses both piston return spring 22 and artificial feel spring 20. Thereafter, any movement to the left or right of shaft 1 is not restrained by artificial feel spring 19 or 20.

Upon removal of the automatic pilot control, the fluid pressure in chambers 8 and 9 is released. Piston return springs 21 and 22 cause pistons 6 and 7, respectively, to return to the neutral position. Artificial feel springs 19 and 20 are again allowed to restrain any movement of shaft 1 from the neutral position. Port 25 in the base of guide rod 3 opens main chamber 10 to the atmosphere, thereby facilitating free motion of piston 6. Similarly, port 26 in end plug 4 opens chamber 11 to the atmosphere, facilitating free motion of piston 7.

Referring to Fig. 3, an alternative arrangement of the hydraulic means used to compress artificial feel springs 19 and 20 of the artificial feel device is shown. Upon switching of the aircraft to an automatic pilot control an auxiliary switching arrangement actuates a pump or other suitable device (not shown) which causes hydraulic fluid to flow from chamber 35 to chamber 33 through ports 41 and 39, and from chamber 36 to chamber 34 through ports 42 and 40. Thus, piston 31 is moved to the left due to an increase in pressure in chamber 33, while the pressure in chamber 35 is correspondingly decreased. Similarly, piston 32 moves to the right due to an increase in pressure in chamber 34, while the pressure in chamber 36 is correspondingly decreased. Upon returning control of the aircraft to the manual pilot control the pump is by-passed, allowing free flow of fluid from chamber 33 to chamber 35, and from chamber 34 to chamber 36. Pistons 31 and 32 are then returned to the neutral position by means similar to springs 21 and 22 of Fig. 1. The advantage of the embodiment shown in Fig. 3 is that no storage tank for the hydraulic fluid is needed.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An artificial feel device comprising a housing, a cylindrical chamber within said housing, a shaft extending longitudinally into said chamber, a lobe on said shaft within said cylindrical chamber, artificial feel springs positioned between said lobe and the ends of said chamber, two pistons fitted to move longitudinally in said chamber but in opposite directions, a sealed chamber formed between a surface of each of said pistons and said housing, inlet ports to said sealed chambers, piston return springs between the ends of said cylindrical chamber and each of said pistons opposing movement of said pistons from a neutral position, and means providing a connection overlapping said artificial feel springs whereby actuation of said pistons removes both of said artificial feel springs from acting on said lobe.

2. An artificial feel device for optionally providing artificial restraining forces opposing translatory movement of manual controls comprising manual control means, a housing having a cylindrical chamber, a shaft operatively associated with said manual control means, said shaft extending longitudinally into said cylindrical chamber, a lobe on the end of said shaft, a spring washer positioned coaxially with said shaft on each side of said lobe, artificial feel springs between the ends of said housing and said spring washers, hydraulic pistons fitted within said housing to move longitudinally in said housing, sealed chambers formed between said pistons and said housing in a manner to cause longitudinal movement of said pistons in opposite directions when subjected to fluid pressure, inlet ducts to said sealed chambers, piston return springs between the ends of said housing and said pistons opposing displacement of said pistons from a neutral position, and a lip on each of said pistons overlapping said spring washers in a manner to cause longitudinal movement of said spring washers corresponding to the longitudinal movement of said pistons whereby actuation of said pistons removes the restraining forces of said artificial feel springs opposing translatory movement of said shaft.

3. An artificial feel device for restraining the movement of manual controls when said controls are moved manually and for freeing said controls from said restraint when said controls are actuated by automatic means comprising manual control means, a housing, a cylindrical chamber within said housing and having a reduced center portion, a piston fitted to move longitudinally in said cylindrical chamber, a second piston fitted to move longitudinally in said cylindrical chamber but in the opposite direction from said first piston, sealed chambers between each of said pistons and said housing at each end of the reduced center portion of said cylindrical chamber, inlet ducts to each of said sealed chambers, piston return springs between each of said pistons and the ends of said housing opposing longitudinal movement of said pistons, a shaft operatively associated with said manual control means, an end of said shaft extending longitudinally into said cylindrical chamber to the midpoint thereof, a lobe on the end of said shaft, lips on each of said pistons extending radially inward opposite said lobe, a spring washer on each side of said lobe, each of said spring washers extending radially outward overlapping said lips on said pistons, and restraining springs between said spring washers and the ends of said housing whereby actuation of said pistons removes said restraining springs from opposing any longitudinal movement of said shaft.

4. An artificial feel device comprising a housing, a cylindrical chamber within said housing, a shaft extending longitudinally into said chamber, a lobe on said shaft within said chamber, artificial feel springs positioned between said lobe and the ends of said chamber, two pistons fitted to move longitudinally in said chamber but in opposite directions, two sealed chambers formed between surfaces of each of said pistons and said housing, inlet ducts to each of said sealed chambers, piston return springs between the ends of said cylindrical chamber and each of said pistons opposing the movement of said pistons from a neutral position, and means providing a connection overlapping said artificial feel springs whereby actuation of said pistons removes both of said artificial feel springs from acting on said lobe.

5. An artificial feel device for optionally providing artificial restraining forces opposing translatory movement of the manual pilot controls of an airplane comprising manual pilot controls, a housing having a cylindrical chamber, a shaft operatively associated with said manual pilot controls, said shaft extending longitudinally into said cylindrical chamber, a lobe on the end of said shaft, spring washers positioned coaxially with said shaft on each side of said lobe, artificial feel springs between the ends of said housing and said spring washers, two hydraulic pistons fitted within said cylindrical chamber to move longitudinally, said pistons being adapted to move in response to fluid pressure, piston return springs between the ends of said housing and said pistons opposing displacement of said pistons from a neutral position, and a lip on each of said pistons overlapping said spring washers in a manner to cause longitudinal movement of said spring washers corresponding to the longitudinal movement of said pistons whereby actuation of said pistons by said fluid pressure removes the restraining forces of said artificial feel springs opposing translatory movement of said shaft.

6. An artificial feel device comprising a housing, a cylindrical chamber within said housing, said cylindrical chamber having a reduced portion on each side of the midpoint thereof, a piston fitted to move longitudinally in said cylindrical chamber, a second piston fitted to move longitudinally in said cylindrical chamber but in the opposite direction from said first piston, sealed chambers between each of said pistons and said housing at each end of each reduced portion of said cylindrical chamber, ducts to each of said sealed chambers, piston return springs between each of said pistons and the ends of said cylindrical housing opposing longitudinal movement of said pistons, a shaft extending longitudinally into said cylindrical chamber to the midpoint thereof, a lobe on the end of said shaft, lips on each of said pistons extending radially inward opposite said lobe, a spring washer on each side of said lobe, each of said spring washers extending radially outward overlapping said lips on said pistons and restraining springs between said spring washers and the ends of said cylindrical chamber whereby actuation of said pistons removes said restraining springs from opposing any longitudinal movement of said shaft.

7. An artificial feel device for optionally providing restraining forces on a shaft comprising a housing having a cylindrical chamber, a shaft extending longitudinally into said chamber and free to move longitudinally therein, spring means positioned between said shaft and the ends of said chamber to oppose axial movement of said shaft, a hydraulic piston adapted to move longitudinally within said chamber, means providing a connection overlapping said spring means at the shaft end thereof, a source of fluid pressure connected to said chamber to actuate said hydraulic piston in a direction to compress said spring means, and a means to control the admission of fluid to said chamber whereby actuation of said hydraulic piston removes the restraining forces of said spring means on said shaft.

References Cited in the file of this patent

UNITED STATES PATENTS

| | | |
|---|---|---|
| 1,018,400 | White | Feb. 20, 1912 |
| 1,273,059 | Hild | July 16, 1918 |
| 1,600,542 | Gagg | Sept. 21, 1926 |
| 1,857,750 | Wilbur | May 10, 1932 |
| 2,106,289 | Wallace | Jan. 25, 1938 |
| 2,365,951 | Hamilton | Dec. 26, 1944 |
| 2,602,662 | Kintzinger | July 8, 1952 |